June 7, 1960 R. B. COTTON ET AL 2,939,310
MEANS FOR TESTING ARRESTING GEAR AND THE LIKE
Filed Dec. 19, 1955 9 Sheets—Sheet 1
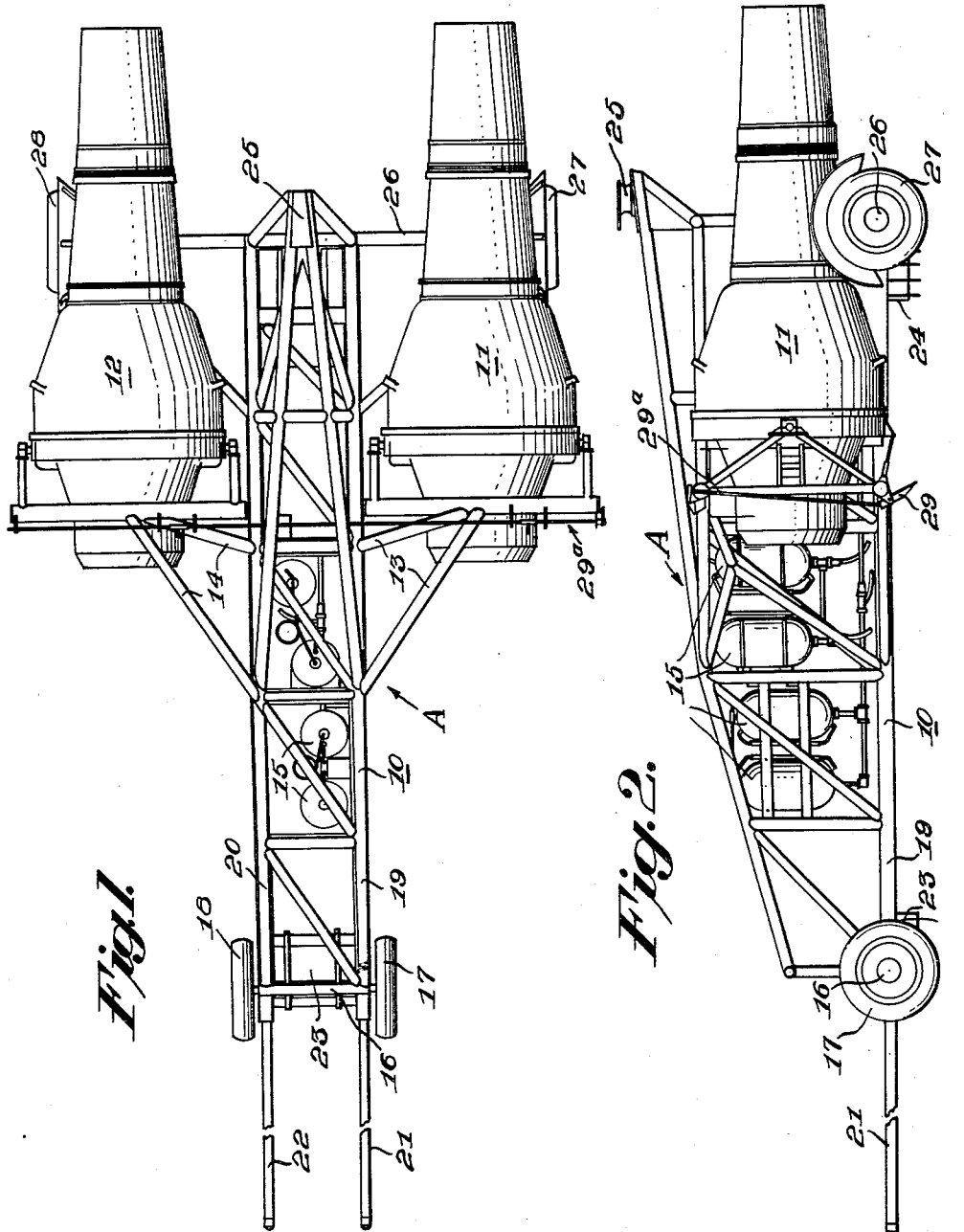
INVENTORS
Robert B. Cotton
Donald B. Doolittle
BY Herbert M. Birch
ATTORNEY

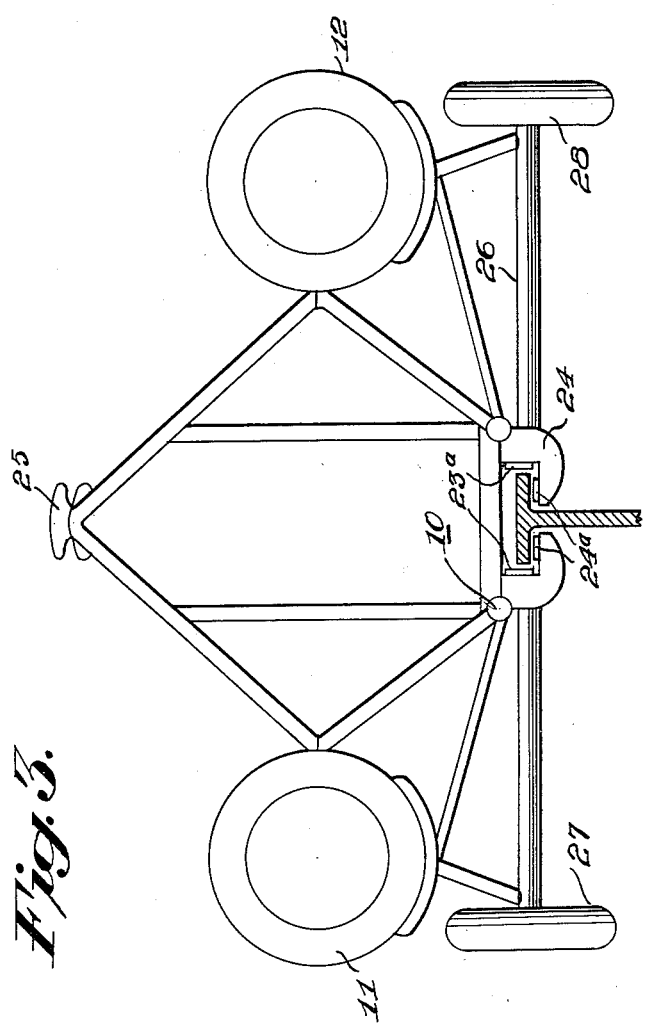

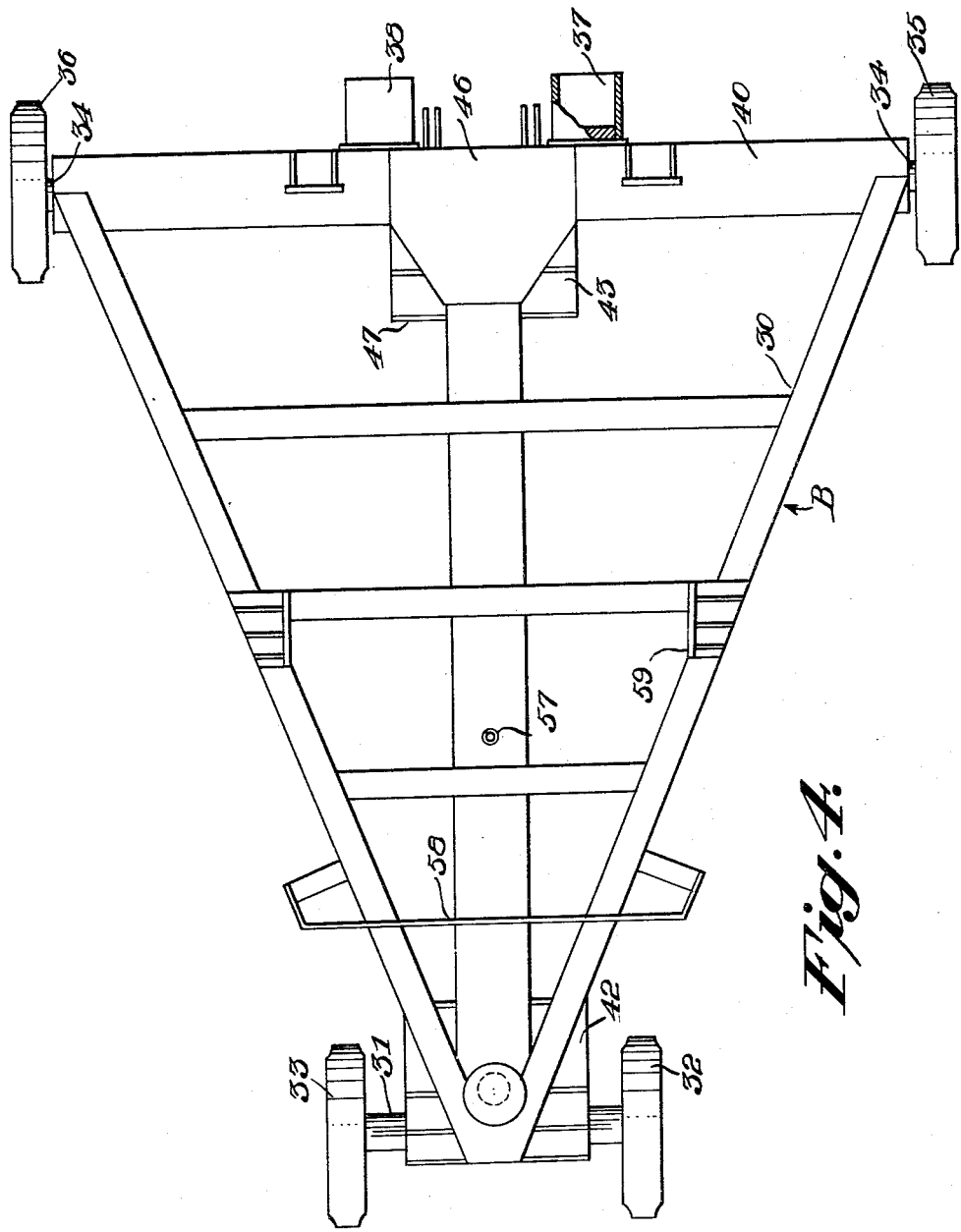

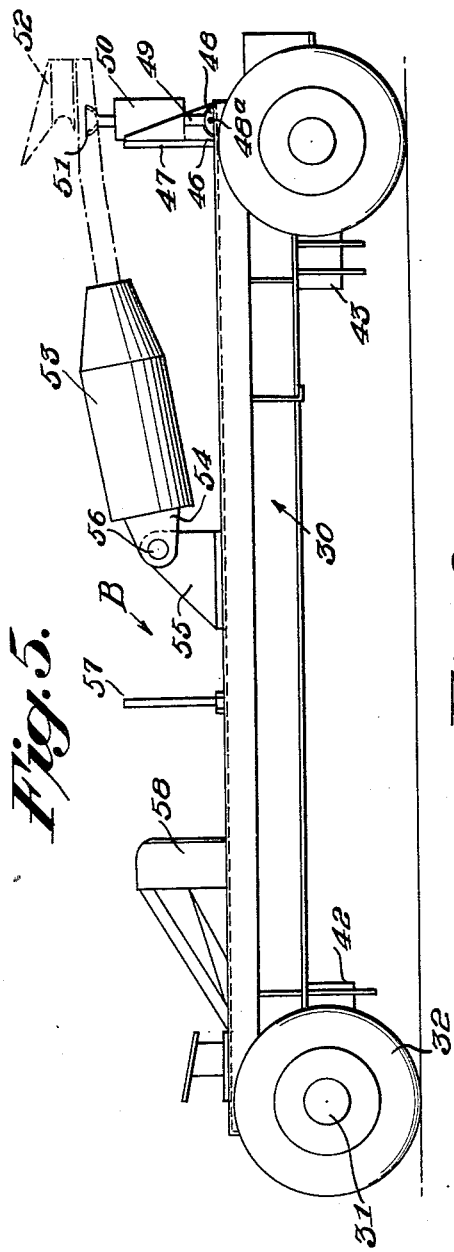
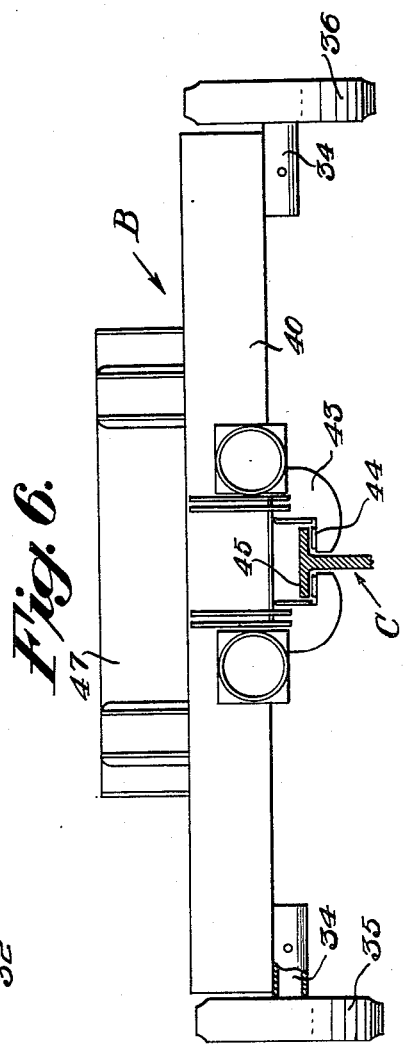

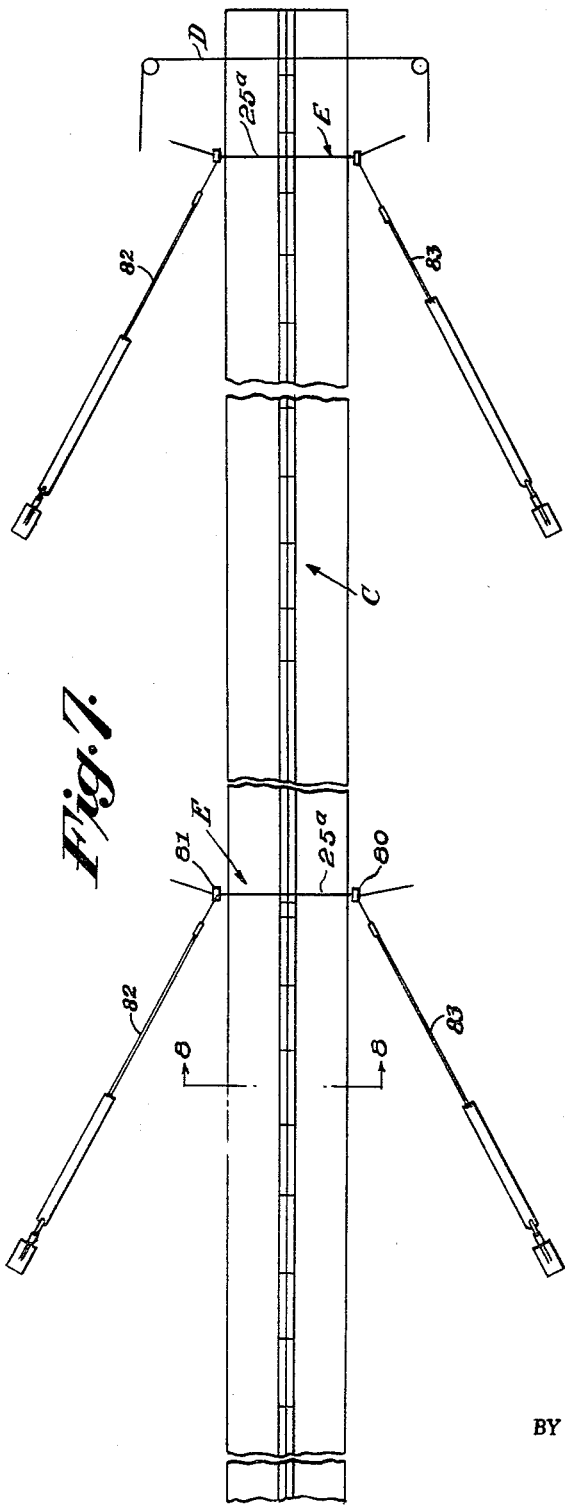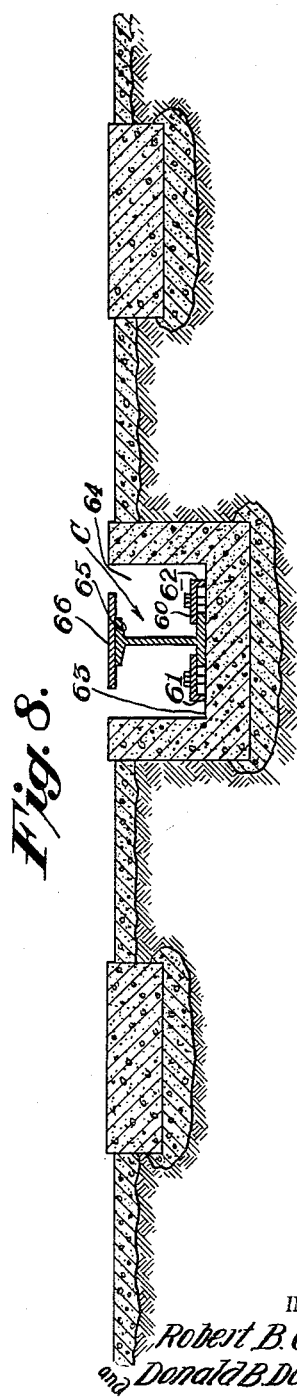

INVENTORS
Robert B. Cotton
Donald B. Doolittle
BY
ATTORNEY

June 7, 1960   R. B. COTTON ET AL   2,939,310
MEANS FOR TESTING ARRESTING GEAR AND THE LIKE
Filed Dec. 19, 1955   9 Sheets-Sheet 7
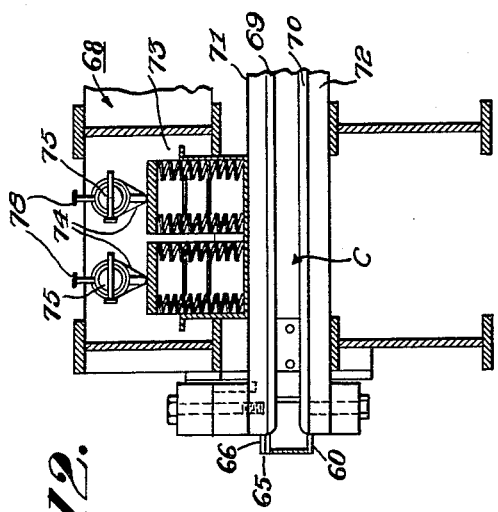
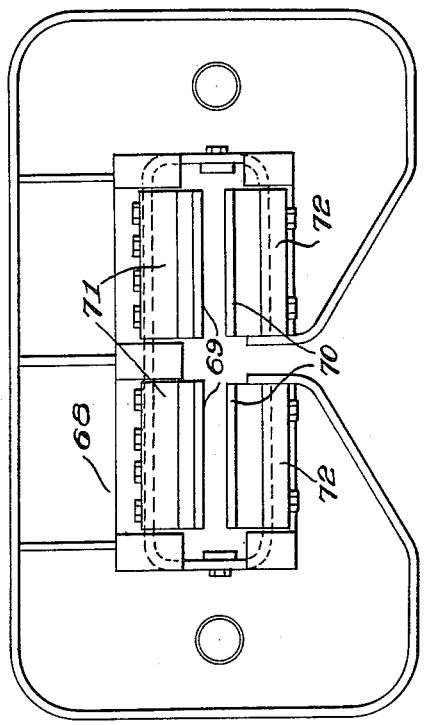
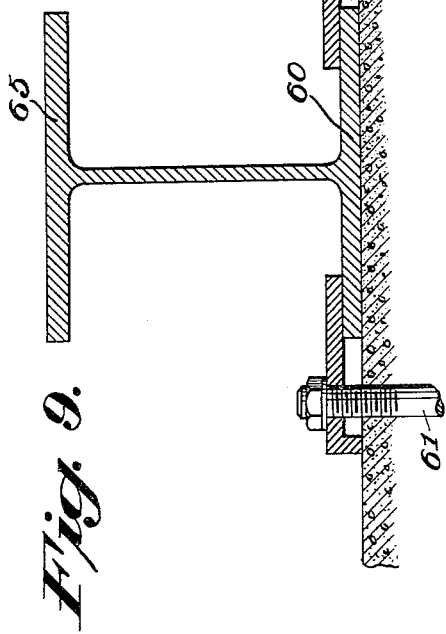
INVENTORS
Robert B. Cotton,
and Donald B. Doolittle.
BY Herbert M. Birch
ATTORNEY

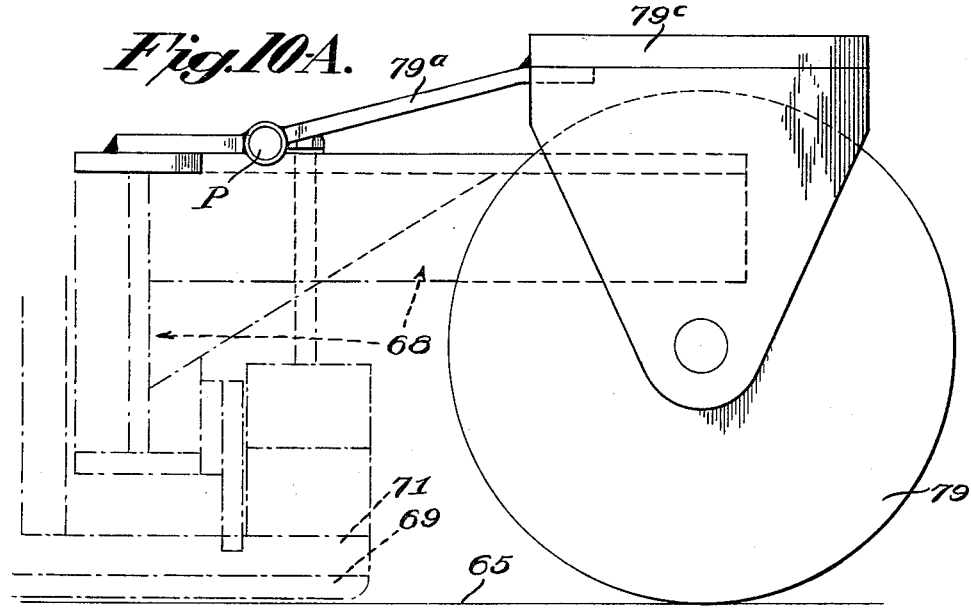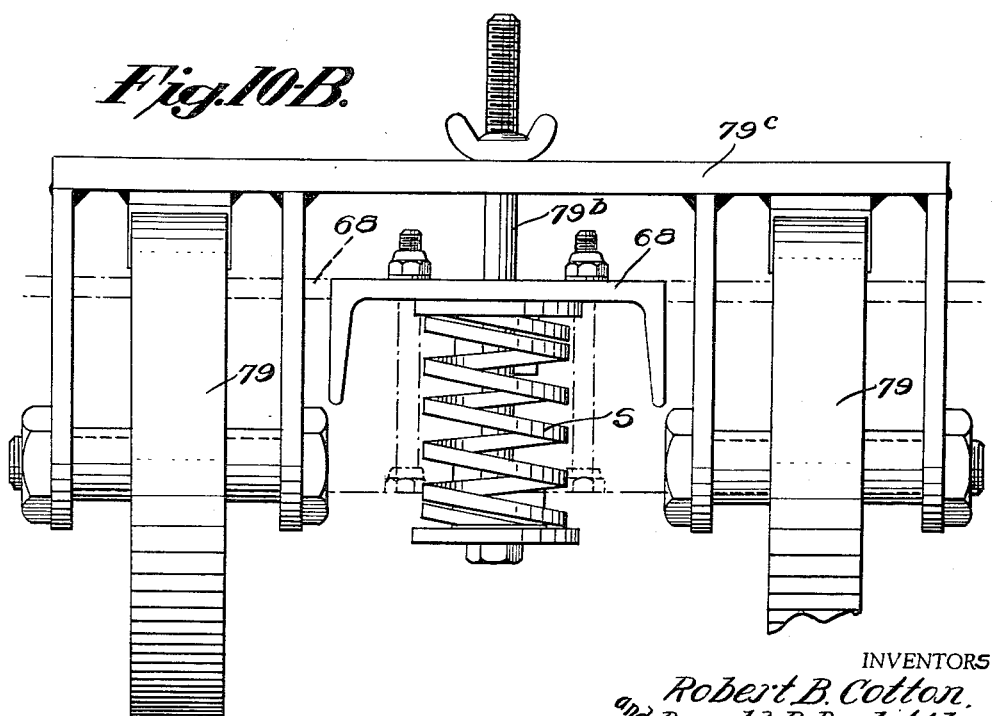

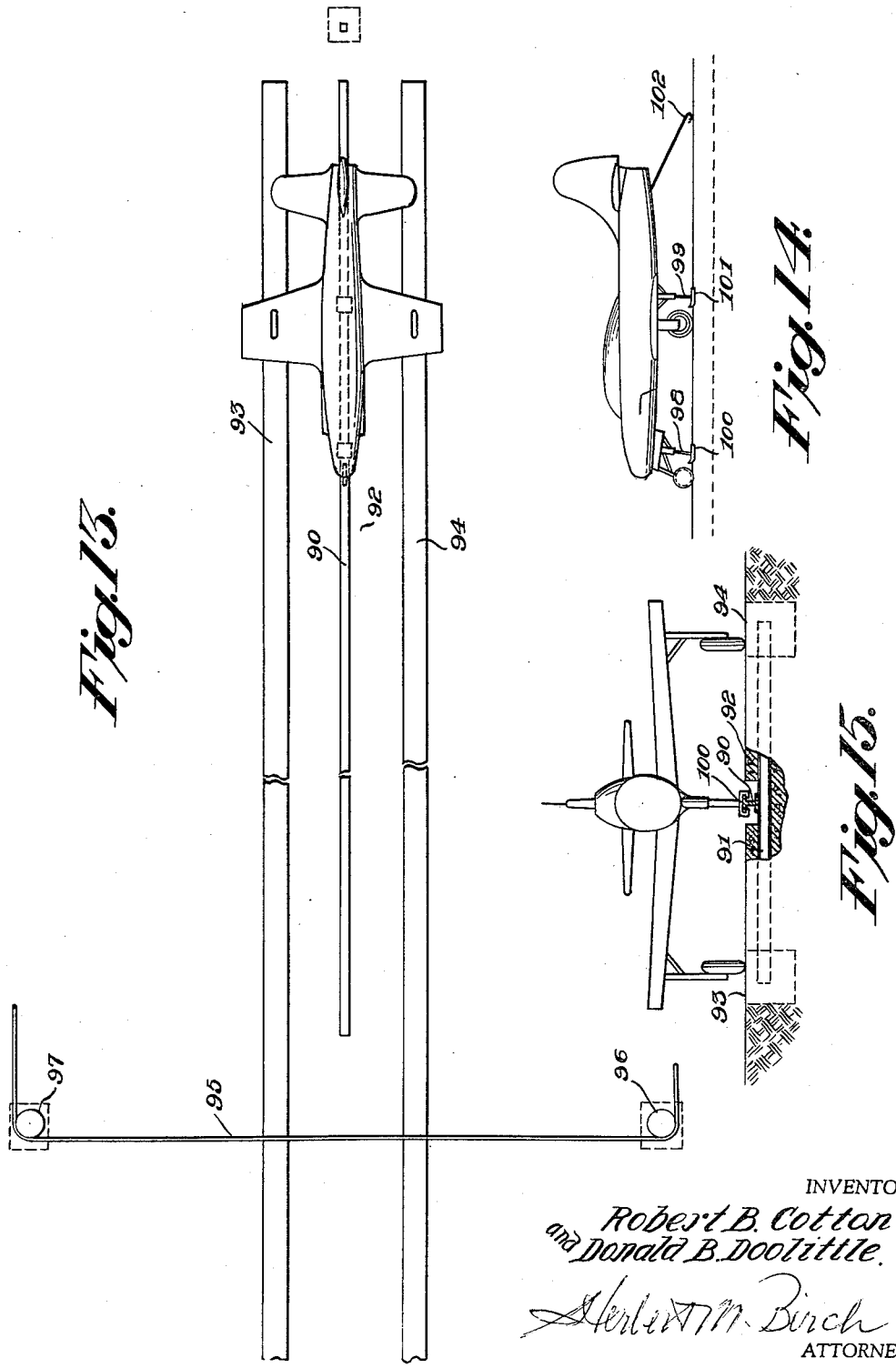

United States Patent Office 2,939,310
Patented June 7, 1960

2,939,310
MEANS FOR TESTING ARRESTING GEAR AND THE LIKE

Robert B. Cotton, Media, Pa., and Donald B. Doolittle, Wilmington, Del., assignors to All American Engineering Company, Wilmington, Del., a corporation of Delaware Filed Dec. 19, 1955, Ser. No. 553,912

7 Claims. (Cl. 73—11)

The present invention relates generally to means for testing arresting gear and any other apparatus required to control the movement of a small or large mass weight on wheels or skids or in some instances prior to wheel or skid touchdown with a surface medium.

An object of the invention is to provide novel means, whereby a captive power source is utilized to produce realistic test results either for a live or a dead load. For example, to test arresting gear of all types and the various components thereof, a moving mass similar in weight to a mobile object to be arrested, such as an automobile or aircraft is propelled under power at varying speeds, that is to test live loads, crashed into a test installation either head on or in some instances angular to the installation to test side swipe reaction, then using the same installation the power means may decouple at varying moments of momentum and speeds and the decoupled free run test load will crash head on or at angular relation to the installation to test the dead load decelerations of the mobile object's weight.

A further object of the invention is to provide a captive jet power means in combination with a captive device adapted to be pushed by said power means for a predetermined distance and then released by braking the power means to coast forward or run free at a predetermined test speed into any suitable test installation across the travel path.

A further object is to provide an arresting gear engaging dolly with an arresting hook adapted to engage the arresting gear in the manner of a landing aircraft.

Still another object is to provide a novel track for the respective pusher dolly and the engaging dolly with means carried by the pusher dolly to connect with a releasable hold back means until a desired thrust is developed by the jet engines of a pusher dolly.

A further object is to provide novel pusher dolly break away and stopping means, whereby the engaging dolly may be made of expendable structures subject to shatter and demolition under certain test conditions.

Still a further object of the invention is to provide a compound test engine system, wherein the valuable test equipment may be carried in safety by one of the units of the system without risk of damage.

Still a further object is to provide a break train system for the present mobile units.

Yet another object is to provide track associated throttle control means for power cut-off during a test run.

In the drawings:

Figure 1 is a top plan view of the engine driven dolly or pusher dolly;

Figure 2 is a side elevational view;

Figure 3 is a rear view of the same;

Figure 4 is a top plan view of the dead load or engaging dolly;

Figure 5 is a side elevational view of the dead load dolly;

Figure 6 is a rear view of the same;

Figure 7 is a top plan view of a track installation for the dolly members;

Figure 8 is a cross section taken on lines 8—8 of Figure 7;

Figure 9 is an enlarged cross sectional view of the track showing in particular the means for securing the base flanges of the track rail to the concrete bottom wall of the channel.

Figure 10A is a side elevational view of one of the brake roller means, with the brake unit in phantom;

Figure 10B is a rear view of a brake roller means;

Figure 11 is an end elevational view thereof;

Figure 12 is a partial longitudinal cross section on lines 12—12 of Figure 10;

Figure 13 is a modification of the invention in top plan disclosing a track and a single jet powered streamlined aircraft with track engaging shuttle brakes;

Figure 14 is a view of the aircraft and track in side elevation; and

Figure 15 is a front elevational view of the aircraft with the track partly in transverse section.

Figure 10:
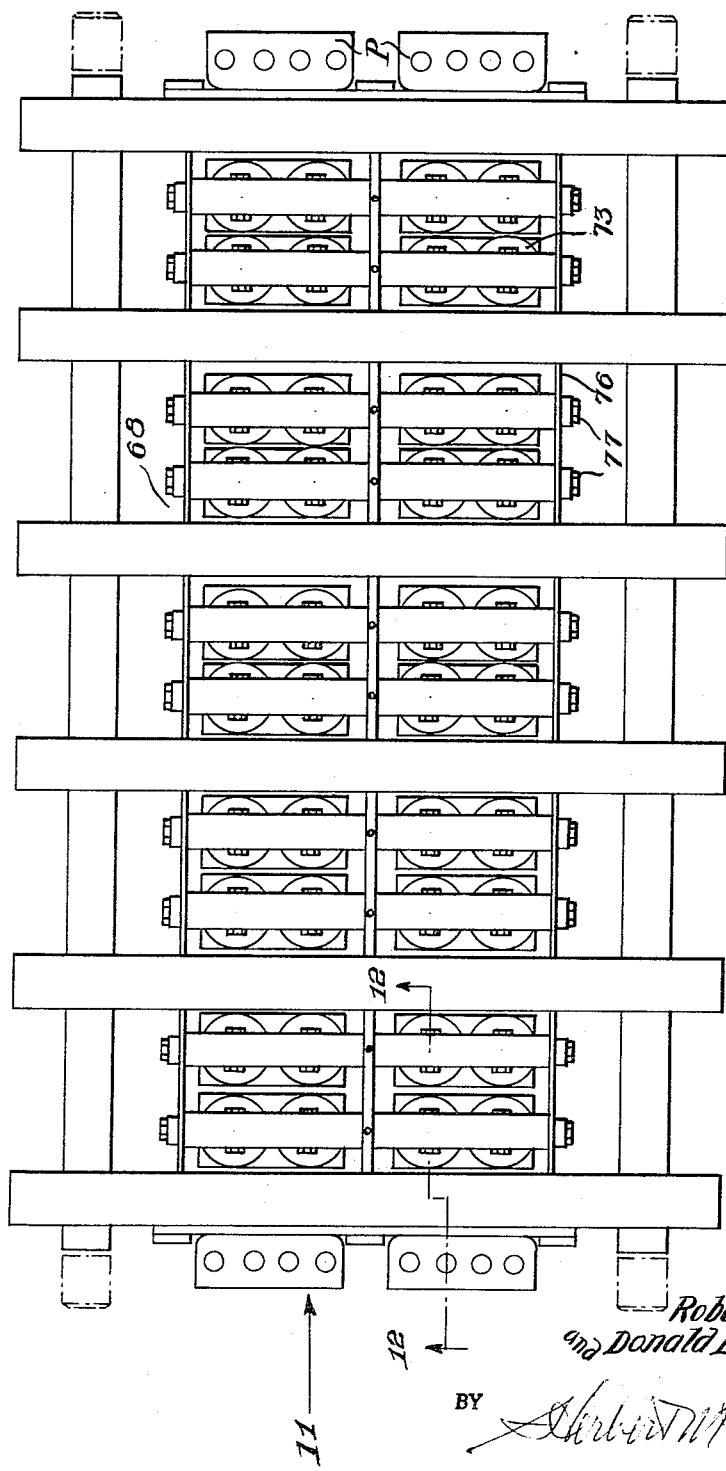
Figure 10 is a top plan view of a brake unit.

Broadly, the present invention comprises three basic units, namely a pusher dolly A, an engaging dolly B and a track C for the units A and B to travel over into engagement with test installations such as D, and auxiliary safety devices E elevated above the track and in a horizontal plane above the arrest installation pendant device.

Pusher dolly

The pusher dolly A, see Figures 1, 2 and 3, comprises a chassis 10 shaped and proportioned to mount two spaced apart jet engines 11 and 12 each on a respective side truss structure 13 and 14. The structures 13 and 14 connect to the main frame 10, which mounts the fuel supply tanks 15 for the jet engines. The elongated frame portion 10 extends forward from the jet engine frames to a transverse axle 16 on each end of which axle are journalled ground wheels 17 and 18. The side members 19 and 20 of the frame 10 may be hollow and serve to mount the power dolly pusher rods 21 and 22. These rods may be cushioned in the hollow members 19 and 20 in any suitable manner to absorb the shock of engagement with the pusher sockets on the engaging dolly B.

Under the chassis and secured thereto are rail embracing means or guides 23 and 24 with track engaging shoes 23ᵃ and 24ᵃ. These guides hold the pusher dolly captive to the track and at the upper tail end of the chassis is a hook 25 adapted to engage an elevated auxiliary safety means E with a nylon pendant 25ᵃ across the track in case the dolly brakes fail. The means E are described in more detail hereinafter. Also, prior to actual motion the pusher dolly may be line anchored until sufficient thrust is developed in the jet engines for the desired test. The jet engines each have a throttle controlled by a lever 29 and connecting linkage 29ᵃ. The lever 29 is adapted to engage an actuating wedge adjacent the track.

Across the rear of the chassis is an axle 26 for the rear ground wheels 27 and 28, which straddle the track similarly to the front wheels 17 and 18.

The engaging dolly

The engaging dolly or dead load dolly B comprises a triangularly shaped chassis 30 having axle means 31 at the front for ground wheels 32 and 33 and a relatively wider spaced axle means 34 for ground wheels 35 and 36 at the relatively wider rear end of the dolly. The rear cross frame 40 of the chassis 30 of the dolly mounts spaced apart pusher sockets 37 and 38 adapted to receive the free ends of the pusher bars or rods 21 and 22 of the pusher dolly A.

Mounted under the front end of chassis 30 and under rear cross beam 40 of the dolly B are track guides 42 and 43 having track shoes 44 slidably embracing the rail head 45, see Figure 6.

The engaging dolly B has the rear cross beam centrally provided with a saddle plate 46 having an upstanding wall 47 formed therefrom, see Figures 4 and 5. Mounted on the saddle plate is coupling base 48 and coupled thereto by a pivot pin 48$^a$ is a dashpot shaft 49, which connects to a shock absorbing dashpot or the like 50. The dashpot or shock absorbing device 50 in turn is pivotally connected by means 51 to the shank of an engaging hook 52 for testing arresting gear installations D or the like. The hook shank carries a suitable piston, not shown, enclosed within the shock absorbing cylinder 53, which cylinder 53 is formed on the opposite end with an apertured coupling lug 54 and is pivoted to a bifurcated bracket 55 formed with spaced apertured ears by means of a transverse pivot pin 56. For the sake of clarity the test installation engaging hook is removed from Figures 4 and 6. Also, vertical rod 57 and upstanding walls 58 and 59 are provided to receive and mount heavy weights, whereby varying test loads may be provided with the same dolly.

The guide track

The guide track C may be of the single rail type shown in Figures 7, 8 and 9, or of a multiple rail type, not shown. The track C comprising a base 60 is securely anchored by suitable means, such as concrete embedded bolts 61 and 62 in the bottom 63 of concrete open topped channel 64, and is formed with a top T-head rail 65 which may be substantially flush with the top of the sides of the channel 64 as for the installation according to Fig. 15, see Figure 8. However the rail extends above the top of the channel for use with the dollies as in Figs. 3 and 6.

The guide rail head 65 at the starting location of the dolly members is relatively thinner than the thickness of the rail head 65 toward terminus or test installation end of the track. For example, the head 65 in Figure 8 discloses a series of spaced brake actuating wedge plates 66 suitably secured thereto by rivets or the like. These plates 66 serve to apply dolly connected brake means 68, see Figures 10, 11 and 12.

The brake means

The brake means 68 engage over and under the surfaces of the head rail 65 of the track and may be coupled to the trailing portion of the jet powered dolly in a train-like arrangement. As many brake train units may be coupled together and to the power dolly as may be required to stop the same from various high speeds developed for each test purpose. Each brake unit 68 comprises a group of spaced apart pairs of spring loaded friction brake members consisting of pairs of upper and lower friction shoes 69—69 and 70—70 engageable with the upper and lower sides of the rail head 65, see Figure 11. The upper shoe means 69 are secured to brake plates 71 and the lower shoe means 70 are secured to lower brake plates 72 below the rail head 65.

The brake shoes are normally held out of contact by track rollers 79 and are held in frictional engagement with the respective upper and lower sides of the rail head 65 by cam controlled spring units 73 when a brake plate section 66 is reached, see Figure 12. These spring units are held compressed against the upper brake shoe plates 71 by cam means 74 carried or formed from elongated rods 75. The rods 75 are mounted for oscillation in end plates 76 by means of their respective hexagonal heads 77, but the rods may be held fixed in the plates 76 by pins 78. Thus the pins 78 hold the cam rods and their respective cams 74 engaged with the brake holding springs 73 and keep the brake shoes in position for engagement with the top and under surfaces of the rail head 65 when a wedge section 66, see Figure 8, is engaged, to thereby cause complete braking engagement to stop the forward drive of the jet powered dolly A. The engaging dolly B may then run free into the test installation D.

The brakes are released by removing the pins 78 from each rod, whereby the rods 75 may be turned to release the brakes by displacement of the cams 74 from the spring units 73. The brake rollers 79 are connected to the respective brake units by arms 79$^a$ pivoted to the brake frame at P, see Figure 10A. Also, the brake engagement level may be adjusted by a carriage bolt 79$^b$ in cross bar 79$^c$ and coil spring S coiled around the same and between the bolt head and the under surface of the brake frame 68.

If the brakes 68 are not sufficient to stop the jet dolly A, when it is travelling at speeds close to or beyond the sound barrier, then the arrest units E will engage with the hook 25 projecting from the rear top portion of the dolly A. The arrest units E comprise a pendant 25$^a$ held above and across the track right of way between standards 80 and 81 on each side of the track. The pendants 25$^a$ connect to undrawn nylon leaders 82 and 83, which are shock absorbing and energy absorbing during elongation by deceleration loads, as is well known in the energy absorber art. Then the engaging or dead load dolly B will run free under the pendants 25$^a$ and the arresting hook 52 of dolly B will engage the arresting gear cable D for a test indication of the same.

Preferably all test instruments are mounted in the power dolly A, except when otherwise necessary to mount some instruments in the engaging dolly B. For example, in some instances, the dolly B may be completely demolished while running free and crashing a test installation.

In some instances both dollies may drag brakes. When this is done the respective brakes are set in the engaging dolly B to operate on a one-inch thick wedge plate 66 attached to the track head 65, while the brakes dragged by the dolly A are set to operate on a one-half inch thick wedge plate 66. Therefore, the engaging dolly brake passes over the one-half inch wedge plate and engages on the one-inch plate and the pusher dolly brake engages on the one-half inch plate. This progressive arrangement of brake control permits both dollies to carry brakes.

A typical operation

The dollies are placed on the track and their respective brakes set. The engine dolly is started and the engines run up to the thrust desired with it still captive to the holdback. When the desired thrust is obtained, the dolly is released. The pusher dolly moves down the guide track pushing the engaging dolly before it. At a predetermined point, the pusher dolly engines are stopped and its trailing brakes are dragged up onto the brake rail. The engine dolly is decelerated to a stop and the engaging dolly continues on down the test track to engage the item to be tested without risk of damage to the pusher dolly. If the engaging dolly is held captive, the dragging brakes on it are applied as soon as the dolly passes over the thickened brake rail area or the brake assemblies may be left off to provide undecelerated engagement of the item to be tested.

This breakway feature of the pusher dolly stopping and the engaging dolly continuing on provides for safe use of costly propulsion units on the pusher dolly and the use of expendable engaging dollies for test purposes.

Another arrangement of the present invention is illustrated in Figures 13, 14 and 15 of the drawings. In this embodiment a similar track installation is disclosed, that is, a track 90 with a T-head rail mounted transverse cross rails 91 in a concrete base 92 with side wheel runways 93 and 94, and a transverse pendant 95 reeved around sheaves 96 and 97 and leading from an engine, not shown.

Over the track an actual jet airplane is straddled with special central oleo struts 98 and 99 carrying track engaging shuttles or guide means 100 and 101, respectively.

To make a test when using this arrangement, it is only necessary to start up the jet engines of the craft and proceed forward under power, until the craft's arrest hook 102 engages a pendant means 95. The power may be cut-off automatically or if a test pilot is in the craft, he may cut off the engines at predetermined time schedules for each test.

The track 90 may end in advance of the test installation so that the craft is entirely free from track engagement prior to pendant engagement. This obviously gives an actual test simulation either under power or on a free run with the power off.

Thus, there is provided a novel apparatus for shock testing live or dead loads in connection with various test items. Such apparatus being adapted to simulate an actual arrest of a landing aircraft or of a land vehicle engagement with an arresting gear or the like.

While we have described and illustrated only two arrangements of the present invention, it is to be expressly understood that other arrangements of the present invention may be developed by those skilled in the art after they have studied the present invention. For a definition of the limits of the present invention, reference should be had to the appended claims.

What is claimed is:

1. Means for testing an arresting gear installation comprising a wheel mounted first power dolly with a power throttle for simulating live test loads and a wheel mounted second non-powered dolly for simulating dead test loads adapted to be pushed by said first dolly and being provided with arresting gear installation engaging means, and brake means adapted to stop said first dolly independently of said second dolly, a track comprising spaced parallel runways and a single guide beam spaced between said runways in equal parallel relation thereto, and said respective dollies each having guide means engageable with said guide beam, said track also including throttle control means for said power dolly.

2. A plurality of wheel mounted test units guided by a track means with a center guide beam, said units comprising a pusher unit powered by jet engines, a non-powered unit engageable and pushed by said pusher unit guided by said beam, and a trailing brake unit connected to said pusher unit engaging with the said guide beam at predetermined locations for stopping said pusher unit independently of said engaging unit, said respective units each being provided with guide beam engaging means and with arresting cable engaging means.

3. Means to produce realistic test results for arresting installations either for a live or a dead load comprising a moving mass similar in weight and dimensions to a mobile object to be arrested, said mass having guide means, a guide beam for guiding said mass into a test installation, and controllable power means for moving said mass under power for a live load test or for a dead load test period after the power is cut off.

4. Test apparatus comprising a jet powered pusher dolly, a non-powered engaging dolly, track means for said dollies, said track means having spaced parallel runways and a center guide rail and brake actuating means secured to said rail at predetermined locations, and brake means movable with said pusher dolly engageable with said actuating means.

5. A plurality of wheel mounted test units guided by a track means comprising spaced parallel runway surfaces and a central single guide beam, said units comprising a pusher unit powered by jet engines, an engaging unit engageable and pushed by said pusher unit, individual trailing brake units connected to the said pusher unit and to the said engaging unit, and first and second brake actuating means mounted on said track at different locations in the direction of a test installation, said first brake actuating means serving to actuate the brakes trailing the pusher unit to stop the same but to be overridden by the brakes trailing the engaging unit, said second brake actuating means serving to stop the engaging unit after said pusher unit has been stopped and separated therefrom by said first brake actuating means.

6. Means for testing arresting gear including a pendant disposed above and transversely of a runway, comprising a guide track means disposed longitudinally of the runway, said track comprising spaced parallel runways and a single guide beam therebetween, a non-powered dolly having means slidably engaged with said guide beam and having means for engaging said pendant, and a powered dolly having means slidably engaged with said guide beam and having automatically releasable means engageable with said first dolly for accelerating same on said track means and toward said pendant, and brake means movable with said powered dolly and cooperating with said track guide means for arresting movement of said powered dolly on said track means and separation thereof from said non-powered dolly, whereby the latter dolly only is subject to force reactions in the testing operation.

7. Means for testing arresting gear including a pendant disposed above and transversely of spaced parallel runways; comprising guide means disposed longitudinally between the runways, a pendant engageable mass slidably engaged with said guide means, a catapult slidably engaged with said guide means and engageable with said mass for accelerating same along the said runways and moving same into engagement with said pendant, and brake means movable with said catapult for decelerating same independent of said mass.

References Cited in the file of this patent

UNITED STATES PATENTS

| | | |
|---|---|---|
| 1,290,318 | O'Connor | Jan. 7, 1919 |
| 1,452,556 | Hackworth et al. | Apr. 24, 1923 |
| 1,583,109 | Banschbach | May 4, 1926 |
| 1,845,282 | Johnson | Feb. 16, 1932 |
| 2,135,033 | Courtney | Nov. 1, 1938 |
| 2,200,028 | Kudo | May 7, 1940 |
| 2,234,752 | Fleet et al. | Mar. 11, 1941 |
| 2,553,632 | Clark | May 22, 1951 |
| 2,639,786 | Northrop et al. | May 26, 1953 |
| 2,724,966 | Northrop et al. | Nov. 29, 1955 |